(12) United States Patent
Park

(10) Patent No.: US 6,330,041 B1
(45) Date of Patent: Dec. 11, 2001

(54) MONITOR HAVING ROTARY TYPE CONTROL BOX

(75) Inventor: Du-Soon Park, Suwon (KR)

(73) Assignee: SamSung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/434,258

(22) Filed: Nov. 5, 1999

(30) Foreign Application Priority Data

May 17, 1999 (KR) .................................................. 99-17652

(51) Int. Cl.[7] ....................................................... H04N 5/64
(52) U.S. Cl. ............................. 348/836; 312/7.2; 361/681
(58) Field of Search ..................... 312/7.2, 7.1; 348/836, 348/837, 838, 841; 361/681, 682, 683, 724, 725, 726

(56) References Cited

U.S. PATENT DOCUMENTS

| | | | |
|---|---|---|---|
| 3,970,782 | * 7/1976 | Fenne | 312/7.2 X |
| 4,095,274 | * 6/1978 | Gordon | 361/681 X |
| 4,709,405 | * 11/1987 | Okazaki | 348/836 X |
| 5,474,372 | * 12/1995 | Jung | 312/7.2 |
| 5,499,115 | * 3/1996 | Kojima et al. | 348/836 |
| 5,623,393 | 4/1997 | Yau . | |
| 5,625,533 | * 4/1997 | Kim et al. | 361/681 |
| 5,737,039 | * 4/1998 | Lopez et al. | 348/683 |
| 5,862,468 | * 1/1999 | Kim | 312/7.1 X |
| 5,925,860 | 7/1999 | Lee . | |
| 5,927,997 | * 7/1999 | Ruland et al. | 361/681 X |
| 6,005,642 | * 12/1999 | Meisner et al. | 348/838 |

* cited by examiner

Primary Examiner—Peter M. Cuomo
Assistant Examiner—Hanh V. Tran
(74) Attorney, Agent, or Firm—Robert E. Bushnell, Esq.

(57) ABSTRACT

A control box for a monitor includes a rotary type control box rotatably engaged at the front casing and having the function buttons formed at a curved outer surface of the rotary type control box. A boss is formed on an outer surface of the control box at a side opposite to the function buttons for hiding the interior of the monitor for thereby enhancing an outer look of the monitor. A stopper is formed at the front casing of the monitor and contacting with the boss when rotating the control box for limiting a rotation of the control box at a certain angle, for thereby preventing any interference with external items near a monitor because a rotary type control box having various function keys and mounted on a front surface of the monitor is not protruding to the outside of the front casing when operating the function keys.

14 Claims, 3 Drawing Sheets

FIG. 3
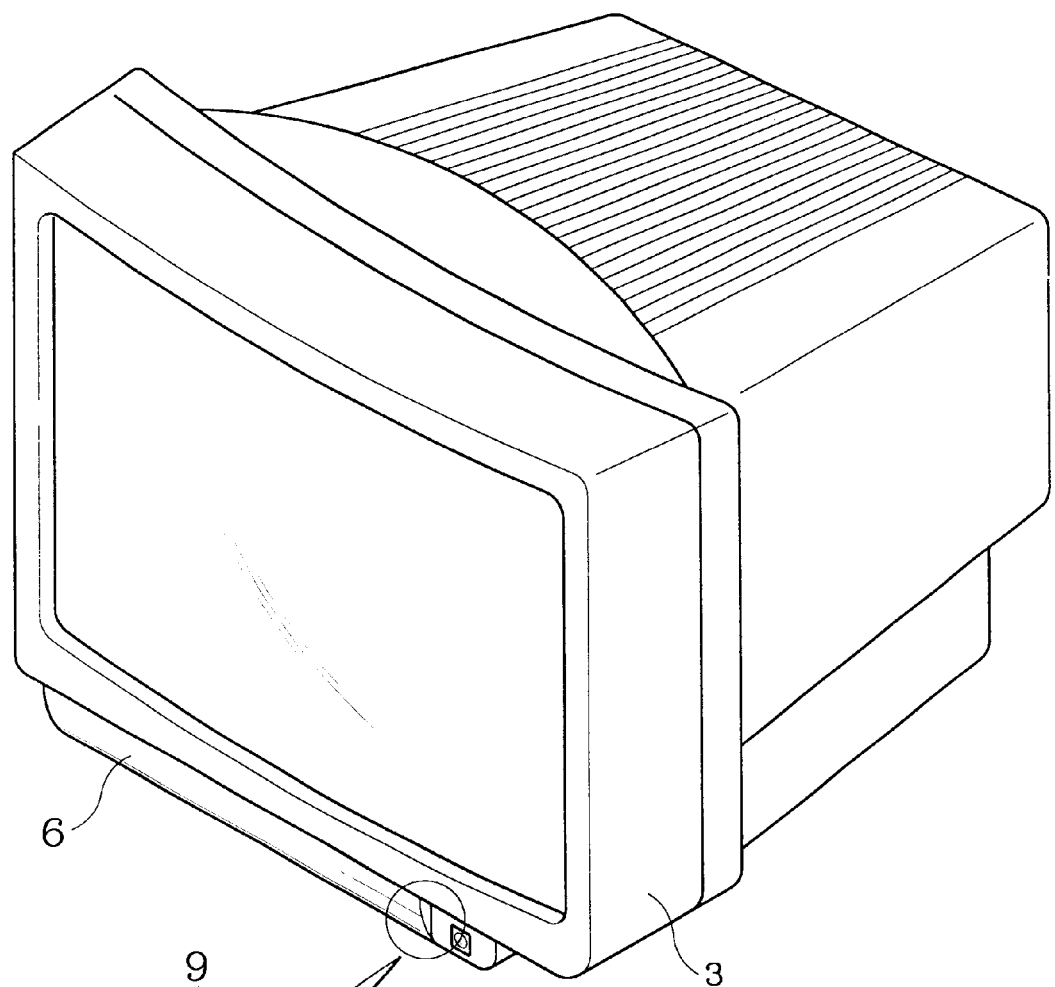
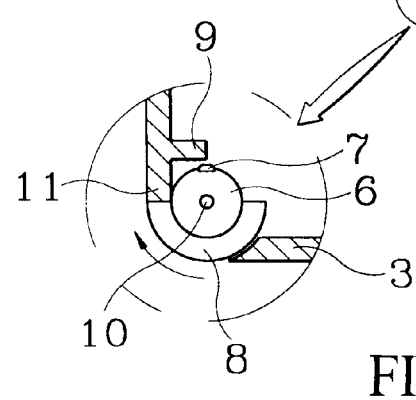
FIG. 3A

MONITOR HAVING ROTARY TYPE CONTROL BOX

CLAIM OF PRIORITY

This application makes reference to, incorporates the same herein, and claims all benefits accruing under 35 U.S.C. §119 from an application entitled Monitor Having Rotary Type Control Box earlier filed in the Korean Industrial Property Office on May 17, 1999, and there duly assigned Serial No. 99-17652 by that Office.

BACKGROUND OF THE INVENTION

1. Field of the Invention

The present invention relates to a rotary type control box for a monitor. In particular, the present invention relates to a rotary type control box for a monitor which is rotatably installed at a front surface of a monitor, thereby preventing any interference while accessing the function keys.

2. Description of the Background Art

Conventional monitors include function buttons to control the display properties such as vertical hold, horizontal hold and power. The location of such function buttons has been a problem. Too many function buttons in the front section of a monitor may be convenient, however, aesthetically unappealing. Furthermore, accidentally hitting one of the important function buttons may cause the monitor to display poorly. To selectively hide such buttons, different methods have been used.

For example, Yau (U.S. Pat. No. 5,623,393, Monitor control panel mounting structrue, Apr. 22, 1997) concerns a monitor control panel mounting structure which includes a control panel pivoted to the housing of a monitor. In the Yau patent, the function button structure protrudes when the function buttons are accessed. There may be interference with objects near the monitor's control panel when accessing the function keys.

Lee (U.S. Pat. No. 5,925,860, Rotary control device, and electronic apparatus using it, Jul. 20, 1999) concerns a rotary control device and an electronic apparatus in which it is used. The switches are disposed along the flat circumference of the switch plate. Only a portion of the switch plate is seen at one time. As the cylindrical switch plate is rotated, different function keys are exposed. Lee's patent does not allow a user to view all the function keys at one time. Rotation of the switch plate is necessary. The small space given for function key entry makes it difficult for users with large or arthritic fingers.

SUMMARY OF THE INVENTION

Accordingly, it is an object of the present invention to provide a rotary type control box for a monitor which is capable of preventing any interference with certain objects near a monitor. A rotary type control box having various function keys and mounted on a front surface of the monitor is not protruding to the outside of the front casing when operating the function keys and therefore not interfering with any external objects near the monitor.

It is another object of the present invention to provide a monitor having a rotary type control box which is capable of decreasing the number of parts of the control box. The decreased number of parts will decrease the fabrication and maintenance cost.

It is another object of the invention to provide dust protection for the function keys and the internal monitor components.

It is another object of the invention to provide an ease of use coupled with an ability to hide or show the function keys for aesthetics.

To achieve the above described objects, there is provided a rotary type control box for a monitor which includes a rotary type control box rotatably engaging the front casing and having the function buttons formed at an outer surface of the rotary type control box. A boss is formed on an outer surface of the control box at a side opposite to the function buttons for hiding the interior of the monitor for thereby enhancing an outer look of the monitor. Furthermore, there is a stopper formed at the front casing and contacting with the boss when rotating the control box for limiting a rotation of the control box at a certain angle.

In the present invention, the cross-section of the rotary type control box is circular. Pivot pins are protruding from both surfaces of the rotary type control box and are rotatably inserted into an engaging groove of the front casing and are rotatable in the clockwise and counterclockwise directions.

The present invention's rotary design prevents any monitor parts from protruding. Therefore, the control box does not interfere with any external items. The present invention also has a limited set of parts, therefore reducing fabrication and maintenance cost. The rotating design protects the function keys from dust. Furthermore, the exposure of the internal parts of the monitor is prevented by a boss on the control box. The present invention is easy to use in that all the key functions are aligned and shown at the same time. The area used to pressing the function keys is the same as if they were mounted directly to the front casing of the monitor. Users are not limited by their finger size or dexterity. The rotational design allows a user to aesthetically hide the function keys when needed or show all of the keys when needed.

Additional advantages, objects and features of the invention will become more apparent from the description which follows.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3 and 3A together form a perspective view illustrating a monitor having a rotary control box according to the present invention.

FIG. 5, is a view illustrating the rotary control box connection with the front casing.

DETAILED DESCRIPTION OF THE PREFERRED EMBODIMENTS

The present invention will be explained with reference to the accompanying drawings.

Figure 1:
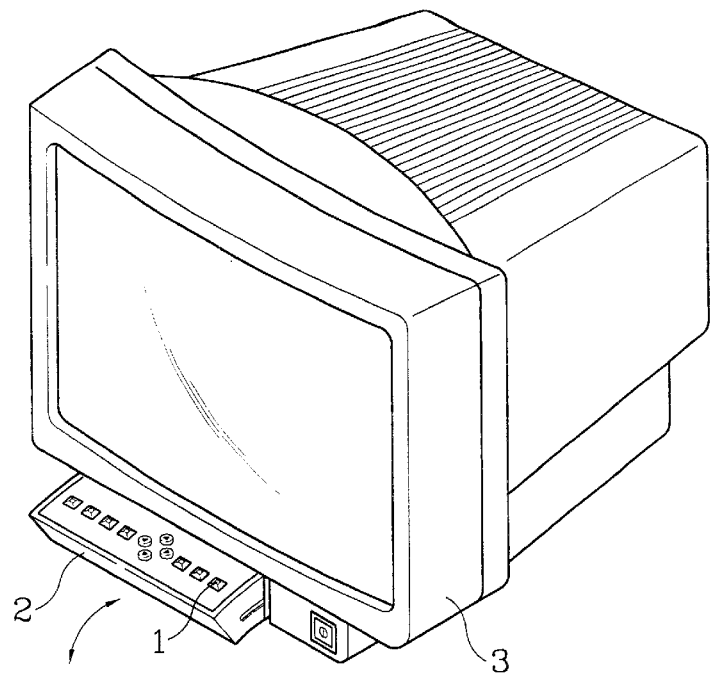
FIG. 1 is a perspective view illustrating a monitor having a slip type control box.

FIG. 1 is a perspective view illustrating a monitor having a slip type control box. As shown therein, a slip type control box is installed at a lower portion of a monitor slidably in a front direction. Various function buttons 1 are installed in the control box for controlling various functions of a monitor. When using the control box 2, a user slides the front casing 3 in a front direction based on a certain pushing force. Namely, when a user pushes a front surface of the control box 2 for operating the function buttons 1, the locked state of the control box 2 is unlocked, so that the control box 2 is guided by a certain guide member formed at both sides, and the control box 2 is forward protruding. In addition, after the function adjusting operation of the monitor is finished, the user pushes the control box 2, and the control box 2 is slidably inserted into the interior of the front casing 3.

However, in FIG. 1, when operating the function keys, since the slip type control box is forward protruding from the front casing of the monitor, the slip type control box may interfere with any nearby items.

In addition, the fabrication cost of the monitor is increased due to the increasing number of parts for slidably moving the control box. Often maintenance is required due to the increasing failure of the parts.

Figure 2:
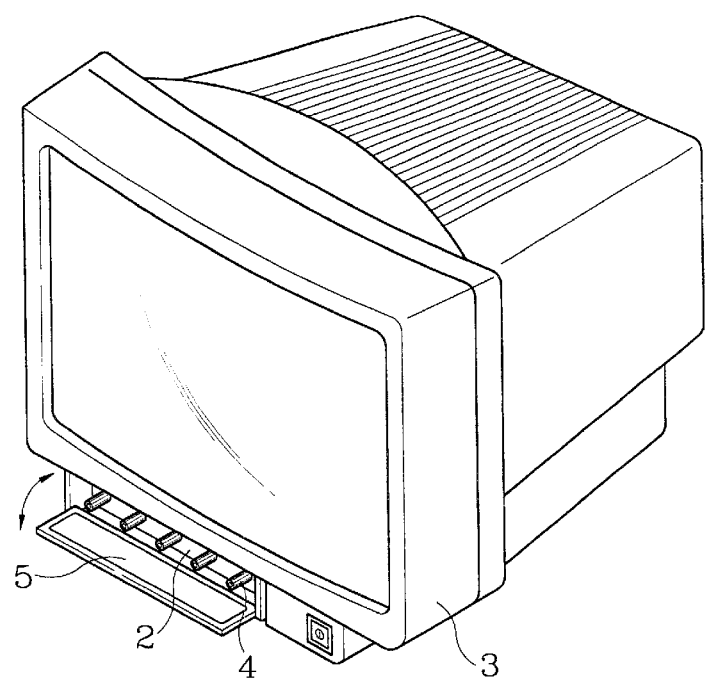
FIG. 2 is a perspective view illustrating a monitor having a door opening type control box.

FIG. 2 is a perspective view illustrating a monitor having a door opening type control box.

As shown therein, a concave type control box 2 is installed at a lower portion of the monitor. In this case, a plurality of function keys 4 are installed in the control box 2 for various functions of the monitor. In addition, a door 5 is installed at a front portion of the control box 2 for preventing certain foreign material from penetrating the interior of the control box 2 when using the function keys 4.

However, in the above-described door opening type control box, when a user operates a function key, since the door is opened away from the front casing, the door may interfere with external items near the monitor.

Figures 4, 4A:
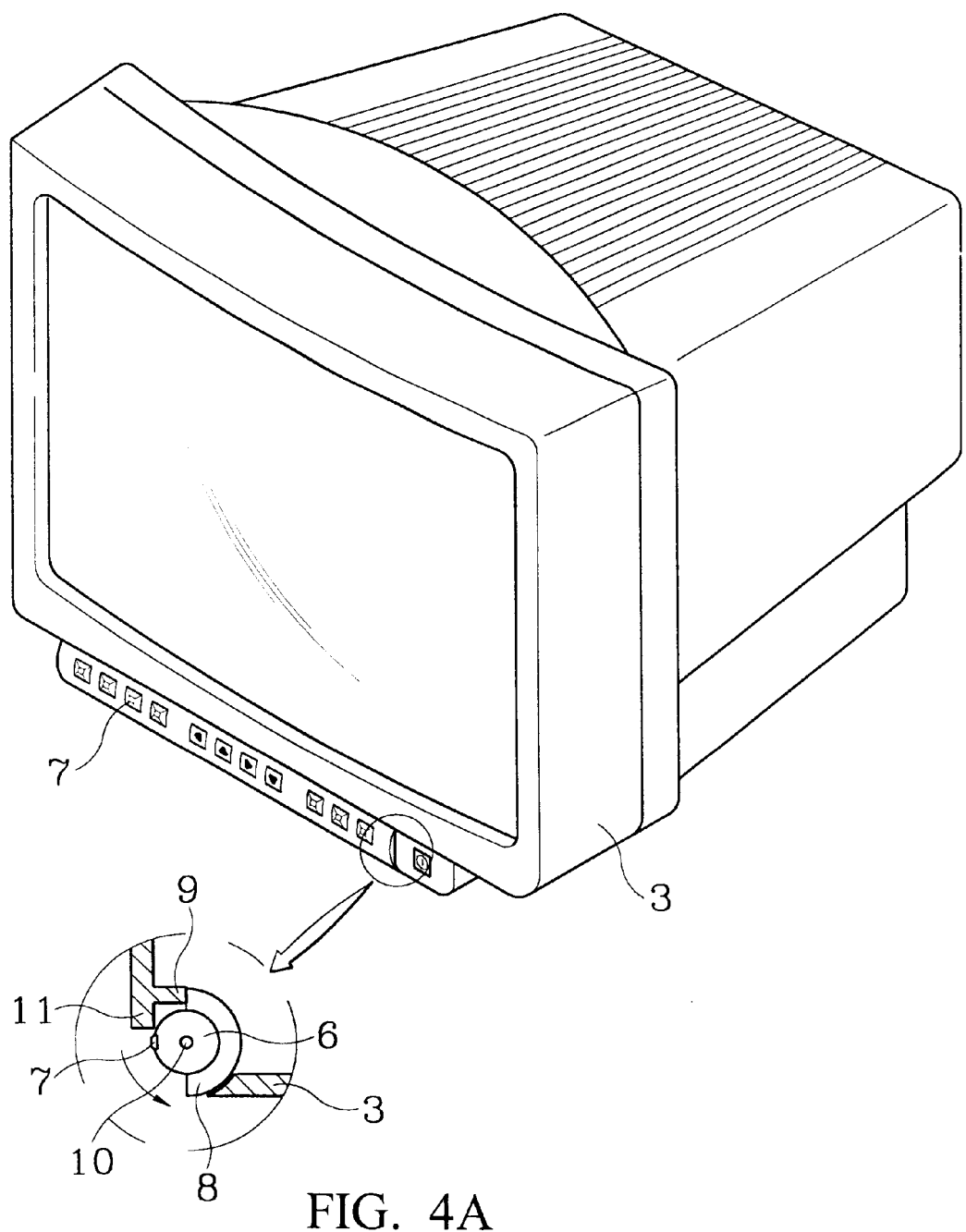
FIGS. 4 and 4A together form a view illustrating the use of a monitor having a rotary type control box according to the present invention.

As shown in FIGS. 3 through 4A, a rotary type control box having various function keys is adapted to a monitor installed at a front casing. Various circuits installed in the interior between the front casing and rear casing will be omitted.

In the present invention, a rotary control box 6 having a circular cross section is rotatably installed at a lower portion of the front casing 3. A pivot pin 10 is protruding from both surfaces of the control box 6. The pivot pin 10 is rotatably inserted into an engaging groove 12 formed at the front casing 3. Therefore, the control box 6 is rotatable in the clockwise and counterclockwise directions.

Function buttons 7 are installed on a curved outer surface of the control box 6, and a boss 8 is integrally installed at a portion opposite to the function buttons 7 of the control box 6. Therefore, it is possible to control various functions of the monitor by adjusting the function buttons 7. In the case that the function buttons are not operated, the exposure of the monitor is prevented by the boss 8 for thereby enhancing an outer look of the product.

In addition, the first stopper (strip) 9 and the second stopper (strip) 11 are protruding from the front casing 3 at a certain position of the monitor. The first stopper 9 and the second stopper 11 are in contact with both sides of the boss 8 of the control box 6 for thereby limiting the rotation of the control box 6.

The operation of the rotary type control box according to the present invention will be explained.

As shown in FIGS. 4 and 4A, when operating the function buttons of the monitor, the rotary type control box 6 is rotated in the arrow direction. At this time, since the pivot pins 10 protruded from both sides of the control box 6 are rotated in the interior of the engaging groove 12 of the front casing 3, the control box 6 is rotated in the counterclockwise direction.

When the control box 6 is rotated in the counterclockwise direction, one end of the boss 8 contacts with the second stopper 9, so that the control box 6 is not rotated.

Therefore, since the function buttons 7 installed on an outer surface of the control box 6 are exposed, it is possible to easily operate the functions of the monitor using the function buttons 7.

As described above, when operating the function buttons 7 of the control box 6, the control box 6 is rotated at a certain position about the pivot pins 10 by a certain angle. Therefore, it is possible to prevent the control box 6 from being protruded in the front direction of the front casing 3 and prevent any interference between the control box 6 and other elements.

FIGS. 3 and 3A together form a perspective view illustrating a monitor having a rotary control box according to the present invention. FIG. 5, is a view illustrating the rotary control box connection with the front casing. As shown in FIGS. 3 and 3A, when the operation of the function buttons 7 is finished, the control box 6 is rotated in the arrow direction. At this time, the pivot pins 10 protruded from both sides of the control box 6 are rotated in the engaging groove 12 of the front casing 3, the control box 6 is rotated in the clockwise direction.

When the control box 6 is rotated in the clockwise direction by a certain angle, one end of the boss 8 contacts with the first stopper 11, so that it is possible to prevent the control box 6 from being rotated.

Therefore, since the interior of the monitor is sealed by the boss 8, it is possible to prevent any foreign material from being inserted into the interior of the monitor.

At this time, the function buttons 7 are positioned within the interior of the front casing 3 based on the rotation of the control box 6, the outer look of the monitor is good.

As described above, since the rotary type control box of the monitor is rotatable at a certain position, when operating function keys, the control box is prevented from being protruded in the front direction of the front casing, so that it is possible to prevent any interferences between the control box and other elements near the monitor.

In addition, since the control box is rotatably engaged at the front casing by pivot pins, the number of parts is decreased, and the assembling time and fabrication cost are significantly decreased.

In the present invention, the number of parts is decreased, and the construction is simple, and the error is decreased, and the maintenance is decreased.

Although the preferred embodiment of the present invention has been disclosed for illustrative purposes, a person skilled in the art will appreciate that various modifications, additions and substitutions are possible, without departing from the scope and spirit of the invention as recited in the accompanying claims. The control box of the present invention can be housed in other apparatus such as audio equipment, video tape recorders, televisions, printers and the like.

What is claimed is:

1. A monitor, comprising:
   a visual display apparatus illustrating varying images in response to applied signals;
   a housing providing an exterior form for said visual display apparatus, said housing having at a front interior portion a pair of grooves on opposite sides and at a concaved recess provided by said housing;

a control panel rotatably engaging said monitor housing, said control panel being cylindrically shaped with a pair of bases forming end portions of said control panel;

a plurality of manually selectable buttons formed on a curved portion of said control panel between said pair of bases, said buttons controlling electronic functions of said monitor through manual manipulation;

a pair of pivots protruding from both sides of said control panel and rotatably received in said grooves of said housing, so that said control panel is rotatable to alternately expose said buttons to said manual manipulation while said control panel is in a first orientation and conceal said buttons from said manual manipulation while said control panel is in a second orientation;

a boss formed on said curved portion of said control panel between said pair of bases, said boss engaging said exterior form;

a first edge of said housing extending in a perpendicular direction from a front side of said housing towards an interior of said monitor, said boss contacting said first edge when said control panel is rotated to said first orientation; and a second edge of said housing extending from said front side of said housing transversely to said first edge, said boss contacting said second edge when said control panel is rotated to said second orientation.

2. The monitor of claim 1, wherein a cross section of said rotary control panel is circular.

3. A monitor, comprising:

a visual display apparatus illustrating varying images in response to applied signals;

a housing providing an exterior form for said visual display apparatus;

a control panel rotatably supported by said housing, said control panel having a pair of bases;

a plurality of buttons aligned on an outer surface of said control panel between said pair of bases, said buttons operationally controlling electronic functions of said monitor through manual manipulation;

a boss formed on said outer surface of said control panel between said pair of bases at a side opposite to said buttons, said boss covering an interior of said monitor; and an edge formed by said housing and contacting said boss during rotation of said control panel, said edge limiting a rotation of said control panel relative to said housing.

4. The monitor of claim 3, further comprising a pair of pivot pins protruding from corresponding ones of said bases and rotatably inserted in a groove of said housing, so that said control panel is rotatable in clockwise and counterclockwise directions while alternately exposing said plurality of buttons for said manual manipulation and concealing said plurality of buttons from said manual manipulation.

5. A monitor, comprising:

a housing including a front casing;

a cylindrically shaped control panel rotatably engaging said housing, said control panel having a plurality of function buttons arrayed along a curved outer surface of said control panel;

a boss formed on said curved outer surface at a side opposite to said plurality of function buttons, said boss hiding an interior of said apparatus;

an edge formed at said front casing and contacting said boss and limiting rotation of said control panel; and pivot pins protruding from both ends of said control panel and rotatably inserted in a groove of said front casing, so that said rotary control box is rotatable in clockwise and counterclockwise directions.

6. A monitor, comprising:

a visual display apparatus illustrating varying visual images in response to applied signals;

a housing providing an exterior form for said visual display apparatus, said housing forming an elongate recess;

an elongate control panel rotatably positioned within said recess, engaging said monitor housing and bearing a plurality of function buttons formed on an outer surface of said control panel;

a plurality of manually selectable buttons formed in an array on an exterior portion of said control panel, said buttons controlling electronic operational functions of said monitor in response to manual manipulation;

said control panel being rotatably mounted within said recess to rotate and alternately expose said buttons to said manual manipulation while said control panel is in a first orientation relative to said housing and conceal said buttons from said manual manipulation while said control panel is in a second and different orientation relative to said housing, said control panel prevented from protruding outwards from said housing;

a boss extending radially outwardly from said exterior portion of said control panel, said boss hiding an interior of said apparatus;

a first edge of said housing extending in a first direction from a front side of said housing towards said recess, said boss contacting said first edge when said control panel is rotated to said first orientation; and a second edge of said housing extending from said front side of said housing transversely to said first edge, said boss contacting said second edge when said control panel is rotated to said second orientation.

7. The monitor of claim 6, wherein said control panel rotates within said recess around an axis and said buttons are aligned parallel to said axis.

8. A monitor, comprising:

a visual display apparatus illustrating varying visual images in response to applied signals;

a housing providing an exterior form for said visual display apparatus, said housing forming an elongate recess;

an elongate control panel rotatably positioned within said recess, engaging said monitor housing and bearing a plurality of function buttons formed on an outer surface of said control panel;

a plurality of manually selectable buttons formed in an array on an exterior portion of said control panel, said buttons controlling electronic operational functions of said monitor in response to manual manipulation;

said control panel being rotatably mounted within said recess to rotate and alternately expose said buttons to said manual manipulation while said control panel is in a first orientation relative to said housing and conceal said buttons from said manual manipulation while said control panel is in a second and different orientation relative to said housing;

a boss extending radially outwardly from said exterior portion of said control panel;

a first edge of said housing extending in a first direction from a front side of said housing towards said recess, said boss contacting said first edge when said control panel is rotated to said first orientation; and a second edge of said housing extending from said front side of said housing transversely to said first edge, said boss contacting said second edge when said control panel is rotated to said second orientation wherein said boss forms an arcuately curved outer surface of said control panel, spaced-apart from said buttons.

9. A method, comprising the steps of:

rotatably engaging a rotary control panel to an interior of a monitor housing, said rotary control panel being cylindrically shaped with a pair of bases, said control panel prevented from protruding outwards from said monitor housing; and forming a plurality of buttons on a curved outer surface between said pair of bases of said rotary control panel, said buttons controlling electronic functions of said monitor through manual manipulation.

10. The method of claim 9, further comprising the steps of:

attaching a pair of pivots to opposite sides of said rotary control panel;

molding a pair of grooves on opposite sides of said monitor; and inserting said pair of pivots in said pair of grooves with said rotary control panel being rotatable in opposite directions; and rotating said control panel about said pivots to alternately expose said plurality of buttons to said manual manipulation and to conceal said plurality of buttons from said manual manipulation.

11. A method,, comprising the steps of:

rotatably engaging a rotary control panel to an interior of a monitor housing, said rotary control panel being cylindrically shaped with a pair of bases;

forming a plurality of buttons on a curved outer surface between said pair of bases of said rotary control panel, said buttons controlling electronic functions of said monitor through manual manipulation; and forming a boss on a curved outer surface between said pair of bases at a side opposite to said plurality of buttons of said rotary control panel, said boss hiding an interior of said monitor.

12. The method of claim 11, further comprising the step of forming an edge at said housing and contacting with said boss when rotating said rotary type control panel, said edge limiting a rotation of said rotary control panel.

13. The method of claim 12, further comprising the steps of:

attaching a pair of pivots to opposite sides of said rotary control panel;

molding a pair of grooves on opposite sides of said monitor; and inserting said pair of pivots in said pair of grooves with said rotary control panel being rotatable in opposite directions; and rotating said control panel about said pivots to alternately expose said plurality of buttons to said manual manipulation and to conceal said plurality of buttons from said manual manipulation.

14. The method of claim 11, further comprising the steps of:

attaching a pair of pivots to opposite sides of said rotary control panel;

molding a pair of grooves on opposite sides of said monitor; and inserting said pair of pivots in said pair of grooves with said rotary control panel being rotatable in opposite directions; and rotating said control panel about said pivots to alternately expose said plurality of buttons to said manual manipulation and to conceal said plurality of buttons from said manual manipulation.

* * * * *